United States Patent [19]

Zimmerman

[11] 4,075,804

[45] Feb. 28, 1978

[54] FIRE RESISTANT ASBESTOS-FREE DOOR, PANEL OR BUILDING ELEMENTS, AND METHOD OF MANUFACTURE USING UNIQUE COMPOSITIONS

[75] Inventor: Herbert E. Zimmerman, Algoma, Wis.

[73] Assignee: Champion International Corporation, Stamford, Conn.

[21] Appl. No.: 615,727

[22] Filed: Sep. 22, 1975

Related U.S. Application Data

[63] Continuation-in-part of Ser. No. 437,727, Jan. 30, 1974, abandoned.

[51] Int. Cl.$^2$ .............................................. E04C 2/00
[52] U.S. Cl. ........................................ 52/232; 52/455; 106/120
[58] Field of Search .......................... 106/120; 52/232

[56] References Cited

U.S. PATENT DOCUMENTS

| 2,593,050 | 4/1952 | Paul et al. ............................... 52/232 |
| 2,698,251 | 12/1954 | Shea et al. ............................. 106/120 |
| 2,787,345 | 4/1957 | Soubier et al. ......................... 52/232 |

*Primary Examiner*—J. Poer
*Attorney, Agent, or Firm*—Evelyn M. Sommer

[57] ABSTRACT

A fire resistant door, panel or building element is manufactured from unique compositions which are free of asbestos, thereby minimizing the health hazards associated with the manufacture of conventional asbestos-containing fireproof doors, panels or building elements. In essence, the compositions comprise calcium silicates, vermiculite, sisal fibers and fiberglass.

5 Claims, 2 Drawing Figures

FIRE RESISTANT ASBESTOS-FREE DOOR, PANEL OR BUILDING ELEMENTS, AND METHOD OF MANUFACTURE USING UNIQUE COMPOSITIONS

This is a continuation-in-part of U.S. application Ser. No. 437,727 filed Jan. 30, 1974, now abandoned.

The present invention is broadly concerned with asbestos-free building construction units and is particularly directed toward an improved type of fire resistant asbestos-free composite door, panel or similar structures using unique compositions. Thus, one object of the present invention is to provide an asbestos-free structural unit such as a door or panel which is practically fireproof, by being highly resistant to the destructive action of fire and extremely high temperatures. The door or panel or equivalent unit of the present invention is composed of a plurality of different materials, each of which functions to raise the fire resistant characteristics of the unit as a whole to an extremely high level.

The invention is more particularly concerned with a fire resistant asbestos-free door and with its method of manufacture whereby the health hazards are substantially eliminated. In essence, the doors or building elements of the present invention are completely free of deleterious asbestos and otherwise are similar to those described in U.S. Pat. No. 2,593,050, patented Apr. 15, 1952, entitled "Composite Fire Door", inventors: H. W. Paul et al; U.S. Pat. No. 3,196,494, issued July 27, 1965, entitled "Fire Resistant Door", inventors: S. Hartman et al; and U.S. Pat. No. 2,787,345, issued Apr. 2, 1957 entitled "Fire Resistant Structural Units", inventors: L. D. Soubirt et al, which disclosures are incorporated herein by reference.

Another object of the present invention is to provide a composite door or structural unit of the type indicated which is highly resistant to leakage or the passage therethrough of hot gases, hot air, smoke or other vapors and which will not warp or bend when subjected to extremely high heat concentrated on one side of the door or panel. Other objects of the present invention are to provide a high quality fireproof unit which is composed of materials which are of a light weight and highly resistant to the transmission of heat therethrough.

In essence, the asbestos-free door or panel of the present invention comprises in combination a core containing vermiculite, sisal fibers and fiber glass and suitable stiles, rails, cross bands, glue sheets and veneer facings.

The composite door or panel structure of the present invention is of such a nature that it will meet the Fire Underwriters Laboratory Inc. for Fire Tests of Door Assemblies Pamphlet U.L. 10(b) 3rd Edition. For example, one test requires the door to pass the code required for a 1½ hour fire door test. In this test, the door must be capable of withstanding, for 1½ hours, flames which cause a buildup of the temperature to 1790° F. on one face of the door. The temperature rise on the opposite face of the door during the first one-half hour must not exceed 250° F. above ambient temperature. At the end of this fire exposure test, the door must withstand the impact of a water hose stream at 30 lbs. pressure, which water hose stream is played on the door from a distance of 20 feet for 1 minute and 47 seconds. As pointed out heretofore, the door or structure of the present invention is highly resistant to the leakage or transmission of high temperature heat which might ignite any flammable materials which are located on the cold side of the structure.

One embodiment of a structure of the present invention may be readily appreciated by reference to the figures illustrating a 1½ hour wood faced fire door.

Figure 1:
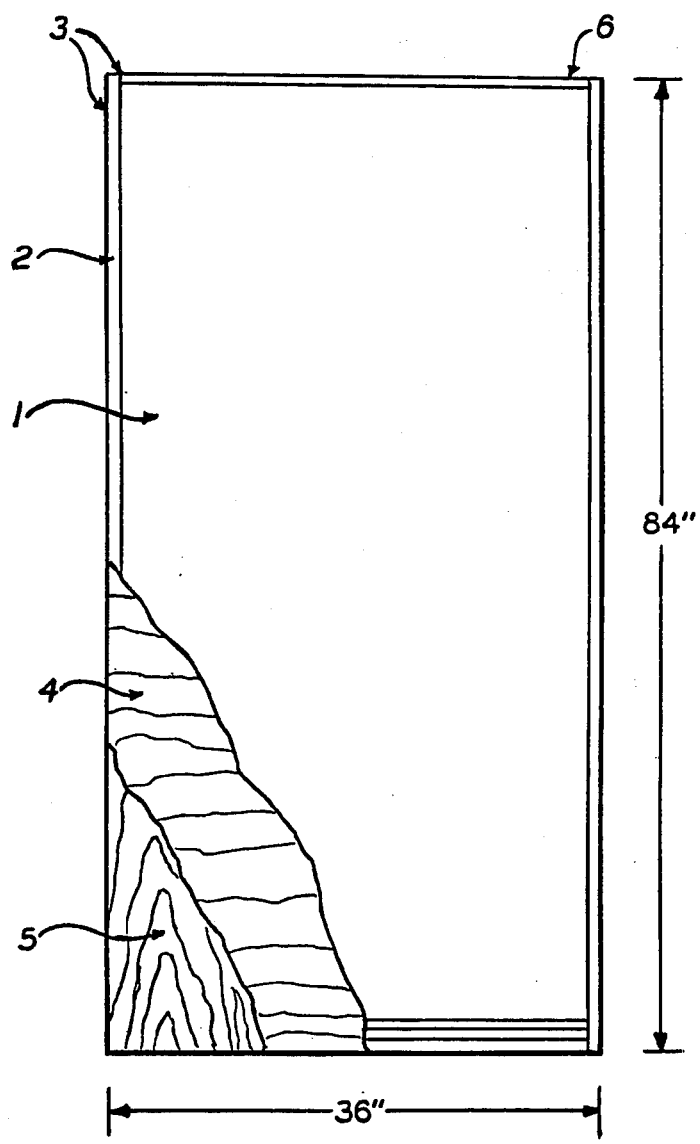
FIG. 1 is a plan view of the door with the facing plies thereof broken away in order to show one form of construction.
Figure 2:
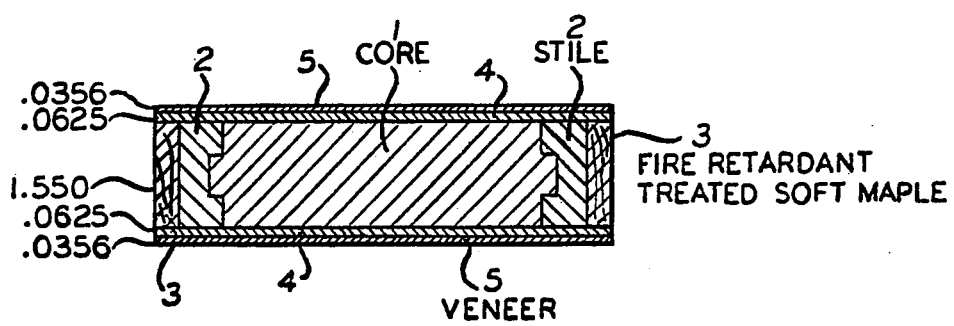
FIG. 2 is a fragmentary cross sectional view through the core and door. The door comprises in essence a fire resistant, asbestos-free core, stiles, rails, cross bands and veneer facings.

Core 1 of the door is asbestos-free and contains fireproof and non-burning inorganic materials which have excellent heat insulating properties. A particularly basic desirable material for the core is modified "Weldrok" which is sold by Champion International Corporation. In essence, the core materials of "Weldrok" consist essentially of an incombustible mineral material of complex metal silicates with asbestos fiber binder. Density of the core material ranges from about 18 to 24 lbs/ft$^3$. Weight/sq.ft. is about 4 lbs. "Weldrok" is warp free and stable and possesses a U factor of approximately 0.35 B.T.U./hr/sq.ft/° F. A desirable density is in the range of 20 to 24 lbs/cu.ft. and a particularly preferred type of material for the core is calcium silicate subhydrate which is rendered porous by manufacturing steps.

Some typical "Weldrok" formulations are listed in the following Table I.

Table I*

|  | Wt % Specific | Range |
|---|---|---|
| Calcium Silicate | 85.0 | 70.0 – 90.0 |
| Asbestos Fibers | 10.0 | 5.0 – 20.0 |
| Moisture | 5.0 | 2.0 – 15.0 |

*A relatively small amount of diatomite may also be present.

In accordance with the present invention a combination of vermiculite, sisal fibers and fiber glass is substituted for the asbestos. The total amount of these three constituents used in the preparation of the core is in the range of about 4% to 10% by wt. such as about 7.0%. If water be excluded the amount of these three constituents based on the other constituents ranges from about 10% to 30%, preferably 15% to 25% by wt., such as about 20%.

Typical satisfactory preparation formulations are listed in Table II.

Table II

|  | Specific Example Lbs. | Specific Example Wt% | Broad Range | Wt. % Preferred Range |
|---|---|---|---|---|
| Water (24 gals) | 192.2 | 66.55 | 50 – 80 | 60 – 70 |
| Lime | 34.0 | 11.79 | 6 – 18 | 8 – 15 |
| Silica | 32.0 | 11.09 | 6 – 18 | 8 – 15 |
| Diatomite | 11.0 | 3.81 | 0 – 6 | 3 – 5 |
| Vermiculite (Expanded) | 16.0 | 5.55 | 3 – 8 | 5 – 6 |
| Sisal Fibers | 3.0 | 1.04 | 0.9 – 1.50 | 1.00 – 1.30 |
| Fiberglass | .5 | .17 | 0.1 – .5 | .15 – 0.4 |
|  | 288.7 | 100.00 |  |  |

By a process hereinafter described, core compositions as listed in Table I will be secured except that a combination of vermiculite, sisal fibers and fiber glass will be substituted for the asbestos. Typical core compositions of the present invention are listed in Table III.

Table III

|  | Wt%** | | |
|---|---|---|---|
|  | Specific | Broad Range | Preferred Range |
| Calcium Silicate | 85.0 | 70.0 – 90.0 | 75.0 – 88.0 |
| Vermiculite | 8.2 | 4.0 – 15.0 | 6.0 – 10.0 |
| Sisal Fibers | 1.5 | 0.5 – 5.0 | 1.0 – 2.0 |
| Fiber Glass | .3 | 0.1 – 1.0 | 0.2 – 0.4 |
| Moisture | 5.0 | 2.0 – 15.0 | 5.0 – 10.0 |
|  | 100.0 | | |

**Various components are adjusted one to the other within the indicated ranges to provide a composition totaling 100%, the adjustment being within the skill of the art.

In preparation silica is ground fine enough to pass through a 200 mesh screen, preferably through a 250 mesh screen. The finer the silica the faster will be the reaction with the lime. The lime must be highly pure calcium oxide and ground fine enough so that at least 98%, preferably 99.24%, passes through a 300 mesh screen, preferably a 325 mesh screen. The diatomite must be ground fine enough to pass through a 200 mesh, preferably through a 250 mesh screen. The lime and silica in the presence of the water react to form calcium silicates. In a preferred embodiment, the resulting amount of calcium silicates in the composition is in the range of preferably 78 to 80% by weight.

The addition of sisal fibers, vermiculite and fiber glass gives additional strength and insulation characteristics to the product. Also, density control is achieved by the selective use of these materials. Preferably, the weight percentage in the composition of the vermiculite is from 7.5 to 10%, whereas the weight percentage of the sisal fibers is in the range of 0.5 to 5.0%. The glass fibers may be in the range of 0.1 to 1.0%, and in this preferred embodiment the amount of moisture is from 2.0 to 15.0% by weight. As indicated above about 98% of the silicates should be sized to pass through a 300 mesh screen.

The diatomite (The Condensed Chemical Dictionary (Reinhold Pub. Co.) 5th Ed. pg. 357) may be eliminated. Use of the combination of lime, silica and diatomite, which contains silica, can be formed into a slab but does not have the required strength unless vermiculite, sisal fibers and fiber glass are also added.

The vermiculite (see page 1150 of the above mentioned Dictionary) is a hydrated magnesium-aluminum-iron silicate. A suitable vermiculite has the following approximate composition: silicon oxide 39%, magnesium oxide 21%, aluminum oxide 15%, iron oxide 5%, potassium oxide 1%, and water 5 to 9%. It functions as filler and has the property of expanding six to 20 times the volume of the unexpired mineral when heated to about 2000° C. Vermiculite expanded can absorb liquids from about 200% to 500% dependent upon conditions. It functions to control density in the core material. The expanded No. 2 Grade vermiculite is a product of Koos Corporation of Kenosha, Wis.

The fiber glass (see page 485 of the Dictionary) is an alkaline resistant glass which dispersed upon contact with the water into fine separate fibers. It is a product of Owens-Corning Fiberglass Corporation.

The sisal (see page 987 of the Dictionary) fibers preferably are relatively long, having lengths in the range from about 0.5 to 3 inches. Preferred lengths are in the range from 1 to 2 inches, such as about 1.5 inches.

The structural frame comprising stiles 2 and rails 6 are fire-treated soft maple. Treating is done by a vacuum pressure cell process. A vacuum of about 22 in. of mercury is produced and the material is drawn into the autoclave. A temperature between 100° F. and 200° F. such as 150° at pressure between 125 psi and 225 psi such as about 175 psi is maintained for between 15 and 20 hours, such as about 18 hours. The treatment solution consists of a combination of monoammonium phosphate, borox and ammonium sulfate.

Fire retardant elements 3, preferably fire retardant treated, are positioned along the stiles 2. The ¼ inch fire retardant treated soft maple is treated as described by the vacuum pressure cell process.

The crossbands 4 contribute greatly to the basic fireproofing composition and nature of the door of the present invention. These crossbands are preferably of a neoprene composition and contribute greatly to the effectiveness of the door. The faces 5 of the door comprise lignocellular material, preferably veneer, and are laminated to the crossbands 4 preferably with a phenolic impregnated adhesive. A preferred type is precatalized phenolic powdered resin HP-401D, made by the Borden Chemical Company. Another satisfactory adhesive is "Tego" sold by Rohm and Haas. Tego is a B stage phenolic impregnated adhesive sheet which will cure under heat.

The dimensions of the panel or door may be varied appreciably depending upon its ultimate use. These dimensions are interrelated and depend upon the size and unit being fabricated. One satisfactory unit is to have the core of a thickness of approximately 1.550 inches. Under these conditions, the rails would approximate ⅞ × 1.550 inches and the thickness of the crossband 4 would approximate 0.0625 inches. One typical group of satisfactory dimensions are given in the Figures.

Thus, the essence of the present invention is concerned with the preparation of a high quality asbestos-free fire resistant core material for the production of fire resistant elements such as a fire resistant door. This is extremely desirable since the U.S. Government is tightening regulations on the use of asbestos because of its carcinogenic nature and asbestosis of the lungs. The regulations presently provide that the use of asbestos must be such that there may be only two fibers per million cubic centimeters of air which requires an almost sterile atmosphere.

In order to further illustrate the invention, the following examples are given.

EXAMPLE I

Using the ingredients and amounts as given in the specific example (Table II), a core was prepared as follows:

About one-half of the water was added to a ribbon blender. All the lime was added, then the silica, then the diatomite and then the vermiculite, in this order. The sisal fibers and then the fiberglass were slowly added followed by the addition of the rest of the water, and thoroughly blended. The mixture was poured into a full slab horizontal tray and cured in an autoclave.

The temperature of the autoclave was about 364° F. The temperature may vary from about 275° to 425° F, preferably in the range from about 325° F to 400° F. The pressure was about 145 psi saturated steam. The pressure may range from about 125 psi to 175 psi. The time cycle was about 20 minutes of venting to exclude the air, then 45 minutes to 2 hours to get the full pressure of 145 psi. The full pressure was held for about 13 hours, and then 2 hours to attain atmospheric pressure.

Thus, the time cycle may vary from about 2 hours to 24 hours.

The cured slab was then dried in an oven at 450° for 14 hours. Two additional hours were used to attain the temperature and 2 more hours to attain room temperature. The temperature of the oven may range from about 400° F to 500° F and the time period from about 10 to 30 hours.

EXAMPLE II

The core prepared as described in Example I was fabricated into a fire resistant door as follows. All stiles and rails were treated as heretofore described.

Steps:
1. A veneer face was placed on a platform.
2. A previously sized and semi-precured crossband with phenolic adhesive applied to both surfaces which was flashed off and semi-precured under an infrared oven was cooled and was placed on the veneer face.
3. The sized asbestos-free core was then applied to the other surface of the semi-precured material.
4. The second crossband with adhesive applied to both surfaces, was cured and cooled in the same manner as the previous one and laid on the core assembly.
5. The second veneer face was applied to the built-up construction.
6. The laid-up assembly was pressed and cured via the hot plate process.
7. After pressing, the 1½ hour fire door was then trimmed to tolerances, sanded, patched, and inspected for imperfections.

EXAMPLE III

The door prepared as described in Example II was fire tested as (1½ hr. Fire Test) described in Underwriters Lab. U L 10(b) 1970, with the following results.

Performance of the door for the 1½ hour test period was good. Cold face temperature at the end of 30 minutes averaged 184° F. (at 1 hour 10 minutes exceeded 250+ ambient).

Warp never exceeded 1 inch (top lock corner). The only appreciable burn-through (through opening) noted after the fire exposure and hose test was 10 inches below the lockset — the Marinite had pulled away from the core, plus a small piece of the core itself was missing.

At the completion of the 1½ hour fire exposure, the door was subjected to the standard UL hose stream test. The door remained in place. The core, itself, exhibited moderate crazing and cracking, very little erosion (although several small pieces broke off) and excellent structural strength and rigidity. There was no apparent expansion of the core material as was anticipated.

The furnace operated at a slight negative pressure during the entire test period. Pressures ranged from −0.02 to −0.04 inches of water.

In summary, in the method of manufacturing a fire resistant composition according to the subject invention calcium silicate in the amount within the range, preferably by weight, of 70 to 88 percentage is formed during the hydrothermal treatment by the reaction between lime and silicate, in the presence of water in the weight percentage of 2.0 to 7.0. To the calcium silicates there are sequentially added silica fibers in weight percentage 0.1 to 1.0%, vermiculite, 7.5 to 10.0 percent, sisal fibers 5.0%, and a second portion of water 1.0 to 7.0 percentage. The mixture is then cured at a temperature within the range of 200° F to 425° F, at a pressure within the range of 125 psi to 175 psi for a period of from 2 to 24 hours. The cured mixture is then dried at a temperature within the range of 400° F. to 500° F. for a period of about 10 to 30 hours.

CONCLUSIONS

Subject door successfully and easily passed 1½ hour fire exposure and hose stream test.

Thus, the present invention eliminates the cancer-causing asbestos, which is extremely desirable. Furthermore, there is less shrinkage of the molded slabs than those currently manufactured. Furthermore, the core blocks do not crack due to the relatively long sisal fibers. Also, the insulation properties of the core of the present invention are excellent. The molded face temperature of the door averaged about 200° F at 30 minutes in the fire test.

What is claimed is:

1. A fire resistant door comprising a core framed within fire resistant stiles and rails, and wherein said core has veneer sheetings, said core having a composition consisting essentially of by weight calcium silicates in an amount within the range of 78.0 to 88.0 percentage; vermiculite, 7.5 to 10.0 percentage; sisal fibers 0.5 to 5.0 percentage; glass fibers 0.1 to 1.0 percentage; and moisture 2.0 to 15.0 percentage.

2. A fire resistant door as in claim 1 wherein said vermiculite has the approximate composition of silicon oxide 39%, magnesium oxide 21%, aluminum oxide 15%, iron oxide 5%, potassium oxide 1%, and water 5 to 9%.

3. A fire resistant door as in claim 1 wherein the sisal fibers have lengths of about 1 to 2 inches.

4. Process for the manufacture of 1½ hour fire test door which comprises positioning a first veneer face on a support, positioning a first semi-precured crossband with adhesive applied to both surfaces on said first veneer, positioning on said first crossband a fire resistant core, said core consisting essentially of 70.0 to 90.0 weight percentage calcium silicates, 4.0 to 15.0 weight percentage vermiculite, 0.5 to 5.0 weight percentage sisal fibers, 0.1 to 1.0 weight percentage fiber glass, and 2.0 to 15.0 weight percentage moisture, then applying to said core a second cross band having adhesive on both surfaces, then applying to said second crossband a cross veneer face, and thereafter pressing and curing at elevated temperatures and pressures.

5. Process for the manufacture of a 1½ hour fire test door according to claim 4 wherein the step of pressing and curing the door is performed in an autoclave in the temperature range of 100° F to 200° F, at a pressure between 125 psi to 225 psi, for a period between 15–20 hours.

* * * * *